United States Patent
Shimizu et al.

(10) Patent No.: US 11,260,819 B2
(45) Date of Patent: Mar. 1, 2022

(54) AIRBAG APPARATUS

(71) Applicant: Autoliv Development AB, Vargarda (SE)

(72) Inventors: Takayuki Shimizu, Kanagawa (JP); Atsushi Nakashima, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 16/984,328

(22) Filed: Aug. 4, 2020

(65) Prior Publication Data
US 2021/0039579 A1   Feb. 11, 2021

(30) Foreign Application Priority Data

Aug. 7, 2019   (JP) .............................. JP2019-145373
Jun. 11, 2020  (JP) .............................. JP2020-101896

(51) Int. Cl.
| | |
|---|---|
| *B60R 21/207* | (2006.01) |
| *B60R 21/233* | (2006.01) |
| *B60R 21/237* | (2006.01) |
| *B60R 21/231* | (2011.01) |
| *B60R 21/2338* | (2011.01) |
| *B60R 21/2334* | (2011.01) |
| *B60R 21/268* | (2011.01) |
| *B60R 21/00* | (2006.01) |

(52) U.S. Cl.
CPC .......... *B60R 21/207* (2013.01); *B60R 21/231* (2013.01); *B60R 21/233* (2013.01); *B60R 21/237* (2013.01); *B60R 21/2334* (2013.01); *B60R 21/2338* (2013.01); *B60R 21/268* (2013.01); *B60R 2021/0048* (2013.01); *B60R 2021/23146* (2013.01); *B60R 2021/23386* (2013.01)

(58) Field of Classification Search
CPC . B60R 21/207; B60R 21/233; B60R 21/2334; B60R 21/268; B60R 21/237; B60R 21/23138; B60R 21/231; B60R 21/2338; B60R 2021/0048; B60R 2021/23146; B60R 2021/23308; B60R 2021/23386
USPC ........................................................ 280/730.1
See application file for complete search history.

(56) References Cited

U.S. PATENT DOCUMENTS

2017/0203711 A1 * 7/2017 Ohno .................... B60R 21/237

FOREIGN PATENT DOCUMENTS

JP         2017081314 A  *  5/2017

* cited by examiner

*Primary Examiner* — Keith J Frisby
(74) *Attorney, Agent, or Firm* — Harness, Dickey & Pierce, P.L.C.; Stephen T. Olson

(57) ABSTRACT

An airbag apparatus equipped in a vehicle seat having a seat cushion that forms a seating surface and a seat back that forms a backrest includes: an inflator that generates inflation gas; and an airbag housed within at least the seat back and deployed by inflation gas released from the inflator. The airbag includes a pair of left and right side chambers that deploy towards the front from a side portion of the seat back and an upper chamber that deploys above the head of a passenger. The airbag is rolled in a direction that intersects the longitudinal direction from a flat unfolded state prior to being housed or folded to be compressed into a long bar shape. A folded portion is formed by folding at least a location corresponding to the upper chamber of the long bar shaped airbag to house the folded portion above the seat back.

14 Claims, 4 Drawing Sheets

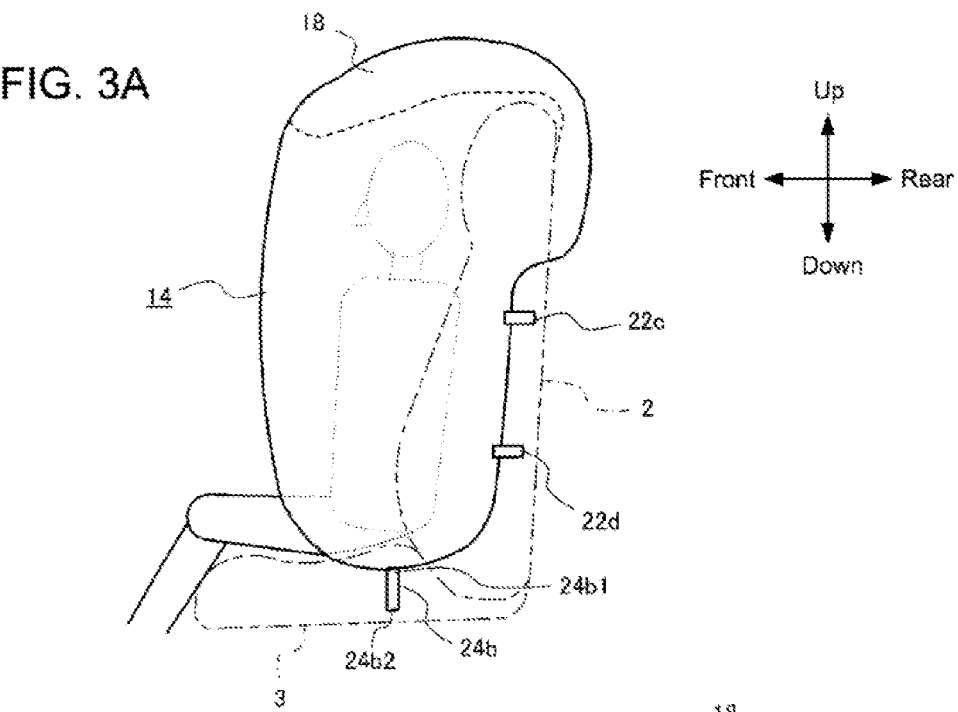
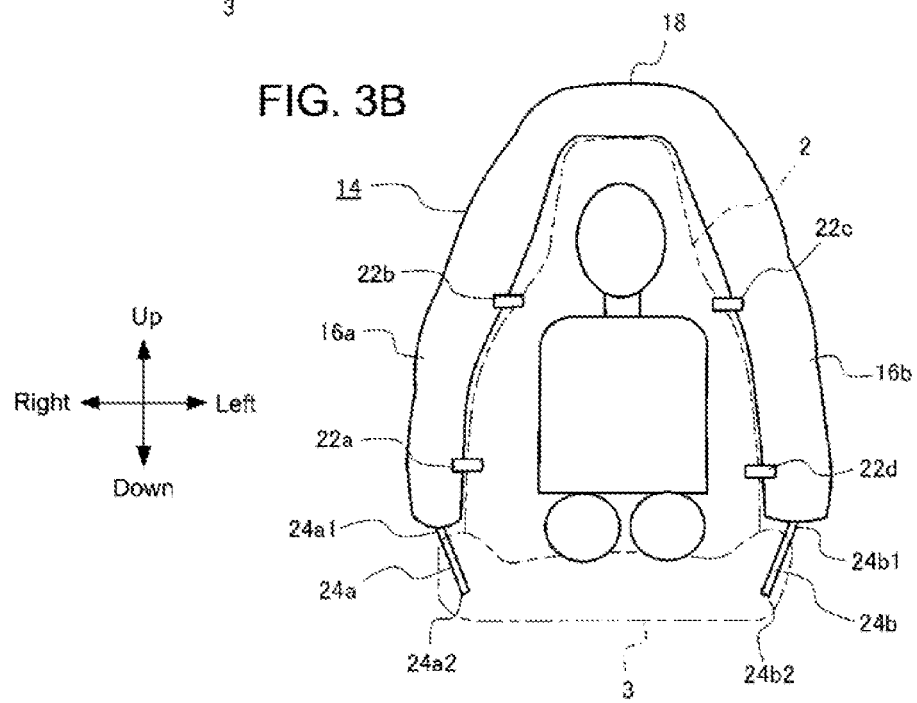

FIG. 4A
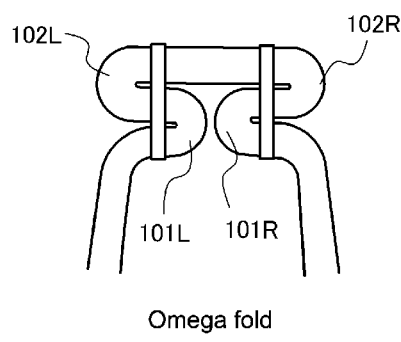
Omega fold
FIG. 4B
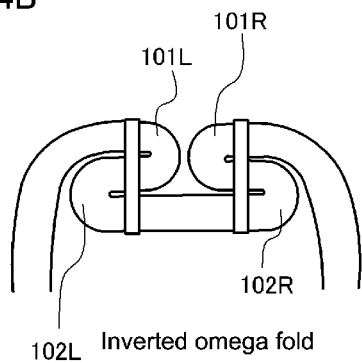
Inverted omega fold
FIG. 4C
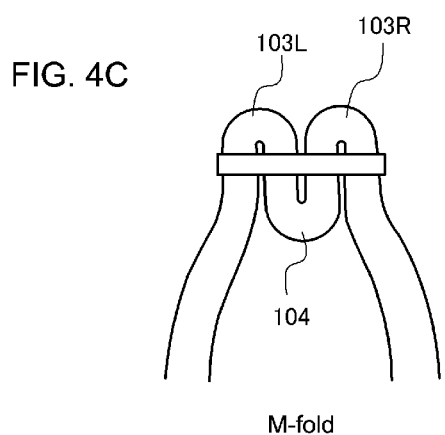
M-fold
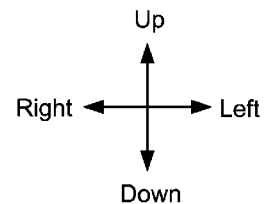
FIG. 4D
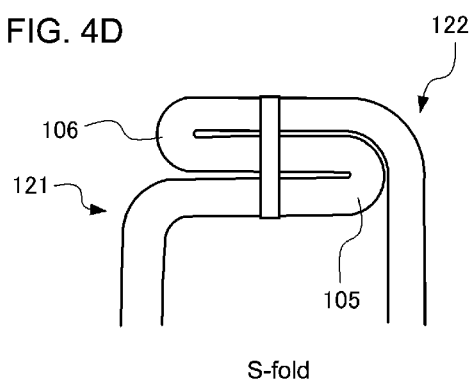
S-fold
FIG. 4E
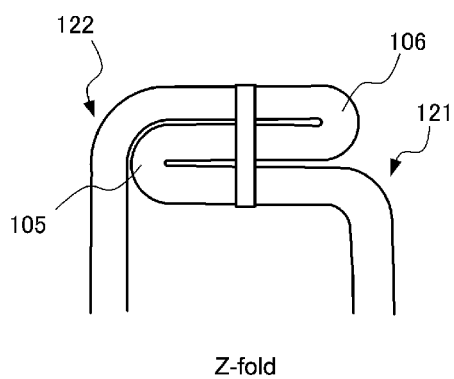
Z-fold

AIRBAG APPARATUS

CROSS-REFERENCE TO RELATED APPLICATIONS

This application claims the benefit of Japanese Patent Application No. 2019-145373 filed Aug. 7, 2019, and Japanese Patent Application No. 2020-101896 filed Jun. 11, 2020, the disclosures of which are herein incorporated by reference in their entirety.

TECHNICAL FIELD

The present invention relates to an airbag apparatus equipped in a vehicle seat. In particular, it relates to an airbag apparatus that may reliably restrain a passenger regardless of the posture of the passenger seated in the seat.

BACKGROUND

In order to protect passengers in the event of a vehicle accident, it is well known that vehicles are equipped with one or more airbags. These airbags include, for example, various forms such as: a so-called driver airbag which is expanded from near the center of the steering wheel of an automobile so as to protect the driver; a curtain airbag which is deployed downward on the inner side of the window of an automobile so as to protect passengers during collisions in the transverse direction of a vehicle, as well as when overturning and during rollover accidents; and a side airbag which is deployed between the passenger and the side panel so as to protect the passenger upon impact in the transverse direction of a vehicle.

In recent years, with advances in vehicle automatic driving technology, it is envisioned that the passenger adopts a variety of seated postures, such as large reclining of the seat, and in such circumstances, it is also necessary to properly protect the passenger.

However, well-known airbag apparatuses mounted in the vehicle seat deploy the airbag from one side on the left or right side or both sides of the seat, which made it difficult to appropriately protect passengers in various postures.

SUMMARY OF THE INVENTION

Problem to be Solved by the Invention

The present invention has been created in view of the abovementioned problems, and an object thereof is to provide an airbag apparatus that may reliably restrain the passenger regardless of the posture of the passenger seated in the seat.

Means for Solving the Problem

The following describes means for solving the abovementioned problem and the effect thereof. In the present invention, when a passenger is seated in a seat in a regular posture, the direction the passenger faces is referred to as the "front," the opposite direction is referred to as the "rear," and the direction indicating the coordinate axis is referred to as the "anteroposterior direction." Moreover, when the passenger is seated in the seat in a regular posture, the right of the passenger is referred to as the "right direction," the left of the passenger is referred to as the "left direction," and the direction indicating the coordinate axis is referred to as the "left and right direction." Similarly, when the passenger is seated in the seat in a regular posture, the head direction of the passenger is referred to as "up," the waist direction of the passenger is referred to as "down," and the direction indicating the coordinate axis is referred to as the "vertical direction."

To achieve the abovementioned object, the present invention provides an airbag apparatus equipped in a vehicle seat having a seat cushion that forms a seating surface and a seat back that forms a backrest, including: an inflator that generates inflation gas; and an airbag housed within at least the seat back and deployed by inflation gas released from the inflator. The airbag includes a pair of left and right side chambers that deploy towards the front from a side portion of the seat back and an upper chamber that deploys above the head of the passenger. The airbag is rolled in a direction that intersects the longitudinal direction from a flat unfolded state prior to being housed or folded to be compressed into a long bar shape. Further, a folded portion is formed by folding at least a location corresponding to the upper chamber of the long bar shaped airbag to house the folded portion above the seat back. Note that the "pair of left and right" side chambers do not necessarily need to be shaped into a left-right symmetrical shape, but may also be shaped into an asymmetric shape.

Here, while it is meant that "a folded portion is formed by folding at least a location corresponding to the upper chamber of the long bar shaped airbag," this does not preclude the folded portion from including not only a location corresponding to the upper chamber but also the portion above the location corresponding to the side chambers.

As with the present invention, by including a pair of left and right side chambers that deploy towards the front from a side portion of the seat back and an upper chamber that deploys above the head of the passenger, the airbag is deployed in a dome shape and covers the entire upper portion from the side portion of the passenger seated in the seat. As a result, it is possible to reliably restrain the movement of the passenger in at least the left and right direction, above, and diagonally above, in addition to being possible to appropriately protect the passenger from the head to the waist of the passenger.

Moreover, by folding and accommodating a location corresponding to the upper chamber of the long bar shaped airbag, deployment of the folded portion is slightly delayed. That is, the unfolded side chambers initially deploy and quickly restrain the lateral movement of the passenger. Folding a location corresponding to the upper chamber also ensures that a sufficient capacity of the airbag to cover the head of the passenger may be ensured above the seat back.

The folded portion preferably extends over the head rest of the vehicle seat and deploys so as to cover the upper portion of the head of the passenger.

The folded portion (upper chamber) may extend over the head rest and deploy so as to cover the upper portion of the head of the passenger to significantly reduce the possibility of damage to the head of the passenger. If the folded portion is deployed from the front of the head rest, the airbag may directly hit the head of the passenger and pose a risk of head injury and/or neck failure.

The folded portion may be shaped substantially symmetrically when viewed from the back surface of the seat back.

By folding the airbag with left-right symmetry, the airbag apparatus according to the present invention may be widely applied to various seats without concern of the far side and the near side of the vehicle seat.

When viewed from the back surface of the seat back, the folded portion may be shaped into an omega ($\Omega$) or inverted omega shape. The omega and inverted omega shapes are described in detail in the examples with reference to the drawings, which will be described briefly below. The bar shaped compressed airbag is disposed substantially along the edges (left edge, top edge, right edge) of the seat back so as to pass from one side surface of the seat back through the upper portion to reach the other side surface. At this time, when a portion extending from the left and right direction end portion of the front portion of the seat back toward the center in the left and right direction is folded back and again extending in the end portion direction (outer side), the forms having a first folded back portion near the center and a second folded back portion that extends in the left right direction from the first folded back portion and is folded back toward the center near the end portion of the upper portion of the seat back, are omega shapes or inverted omega shapes. Further, the form in which the first folded back portion is located below the second folded back portion is an omega shape, and conversely, the form in which the first folded back portion is located above the second folded back portion is an inverted omega shape.

Shaping the folded portion into an omega shape increases the momentum of the folded portion deploying upward when the airbag is deployed, and even when the head rest is relatively large, the airbag (upper chamber) is more likely to protrude towards the front extending over the head rest.

On the other hand, by shaping the folded portion into an inverted omega shape, when the airbag is deployed, the folded portion is more likely to deploy toward the left and right width direction, allowing the movement of the head of the passenger in the left and right direction to be quickly restrained.

The folded portion may be shaped into an M shape when viewed from the back surface of the seat back. The M shape is described in detail in the examples with reference to the drawings, which will be described briefly below. The bar shaped compressed airbag is disposed substantially along the edges (left edge, top edge, right edge) of the seat back so as to pass from one side surface of the seat back through the upper portion to reach the other side surface. Further, the form having a third folded back portion that extends in the upper portion direction from the left and right end portions of the upper portion of the seat back and is folded back toward the center direction and the lower side, along with a fourth folded back portion that extends downward from the third folded back portion and is folded back near the center, is an M shape.

By shaping the folded portion into an M shape, when the airbag is deployed, the folded portion is more likely to deploy toward the left and right width direction, allowing the movement of the head of the passenger in the left and right direction to be quickly restrained.

When viewed from the back surface of the seat back, the folded portion may be asymmetrically shaped. For example, the folded portion may be shaped into an S shape or a Z shape when viewed from the back surface of the seat back. The S shape and the Z shape are described in detail in the examples with reference to the drawings, which will be described briefly below. The bar shaped compressed airbag is disposed substantially along the edges (left edge, top edge, right edge) of the seat back so as to pass from one side surface of the seat back through the upper portion to reach the other side surface. Further, the forms having a fifth folded back portion that is folded back so that a rod shape airbag extending from one end portion (first end portion) to the other end portion (second end portion) of the upper portion of the seat back is folded back toward the first end portion in the vicinity of the second end portion, along with a sixth folded back portion that extends from the fifth folded back portion and is folded back so as to extend back toward the second end portion at the first end portion, are an S shape and a Z shape. Note that in the S shape and the Z shape, the first end portion and the second end portion are reversed.

By shaping the folded portion so as to be left-right asymmetric, such as an S shape or a Z shape, deployment on the left and right side of the seat back quickens, while deployment on the other side is delayed; therefore, for example, by disposing the one that deploys earlier on the near side (door side), the passenger may be appropriately protected during a side collision. That is, by using a different airbag in the folding direction (S shape or Z shape) on the near side and the far side, it becomes possible to appropriately protect the passenger during a side collision.

The upper chamber may be configured to deploy from near the upper end of the back surface of the seat back.

Deploying the upper chamber from near the rear edge of the upper end of the seat back allows the upper chamber to extend over the head of the passenger towards the front direction so as to cover the upper portion of the head of the passenger, thereby preventing the airbag from directly striking the head of the passenger.

Inflation gas released from the inflator may be configured so as to flow from the side chambers to the upper chamber. At this time, the inflator is preferably coupled to each of the pair of left and right side chambers.

The configuration by which the inflation gas flows from the side chambers to the upper chamber allows the side chambers to initially deploy and quickly restrain the lateral movement of the passenger.

A portion of the long bar shaped airbag below the folded portion may be housed along the longitudinal direction of the side surface of the seat back.

The inflator may be configured so as to be coupled to each of the pair of the left and right side chambers.

The inflator may be disposed within a range spanning the thoracic region, the abdominal region, and the waist region of the passenger.

A first connecting member that fixes the long bar shaped airbag to the seat back is preferably provided in at least one of the head region, the thoracic region, the abdominal region, and the waist region of the passenger.

A structure may be provided that includes a second connecting member connected to the vicinity of an end portion of the long bar shaped airbag and a side portion of the seat cushion.

BRIEF DESCRIPTION OF THE DRAWINGS

FIGS. 1(A) and 1(B) illustrate the state in which an airbag apparatus according to the present invention is mounted on a vehicle seat, wherein FIG. 1(A) illustrates the state when viewed from the side in the left and right direction of the vehicle, while FIG. 1(B) illustrates the state when viewed from the front. Note that the vehicle seat is illustrated as being transparent.

FIGS. 2(A) and 2(B) illustrate the structure of an airbag employed in the airbag apparatus according to the present invention, wherein FIG. 2(A) is a plan view illustrating the state in which the airbag is deployed (state prior to being housed), while FIG. 2(B) is a front view illustrating the state in which the airbag is rolled (state when housed).

FIGS. 3(A) and 3(B) illustrate the operating state (airbag deployment state) of the airbag apparatus according to the present invention, wherein FIG. 3(A) illustrates the state when viewed from the side in the left and right direction of the vehicle, while FIG. 3(B) illustrates the state when viewed from the front.

FIGS. 4(A) to 4(E) are explanatory diagrams illustrating variations of the airbag apparatus according to the present invention.

DESCRIPTION OF THE PREFERRED EMBODIMENT

A vehicle seat according to an embodiment of the present invention will be described with reference to accompanying drawings. In each figure, note that "front" denotes the direction the passenger is facing when the passenger is seated in the seat facing the traveling direction in a regular posture, "rear" denotes the opposite direction to the "front," "inside" denotes the inside in the vehicle width direction (on the passenger side), and "outside" denotes the outside in the vehicle width direction (on the door panel side), respectively.

Example 1

Figure 1A:
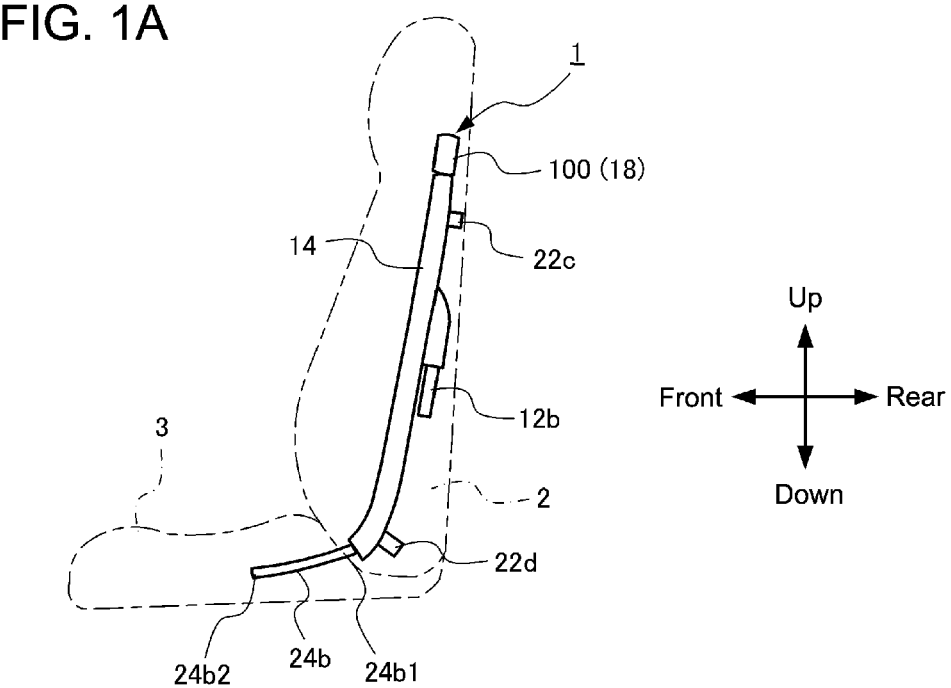
Figure 1B:
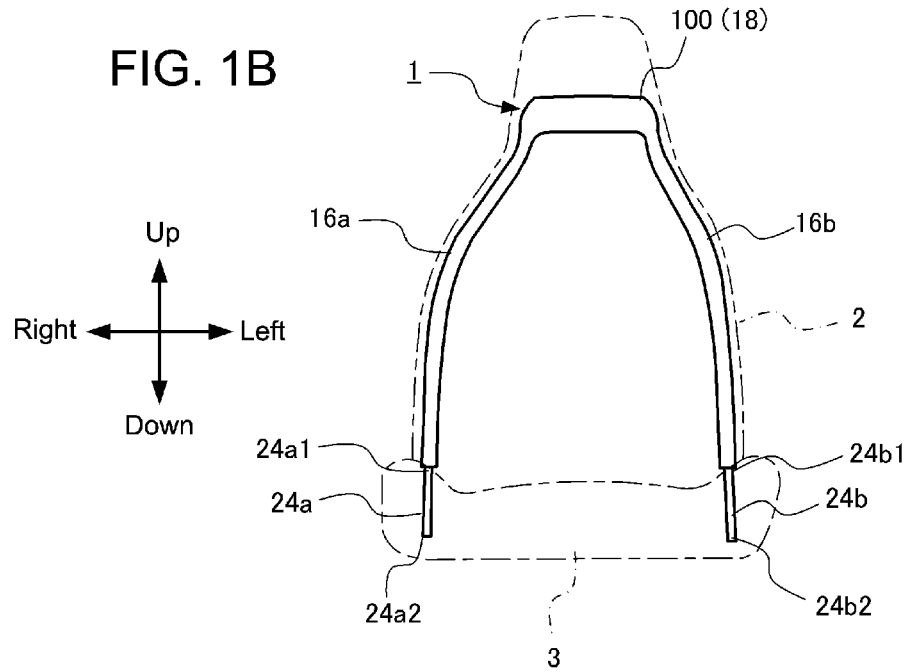
Figure 2A:
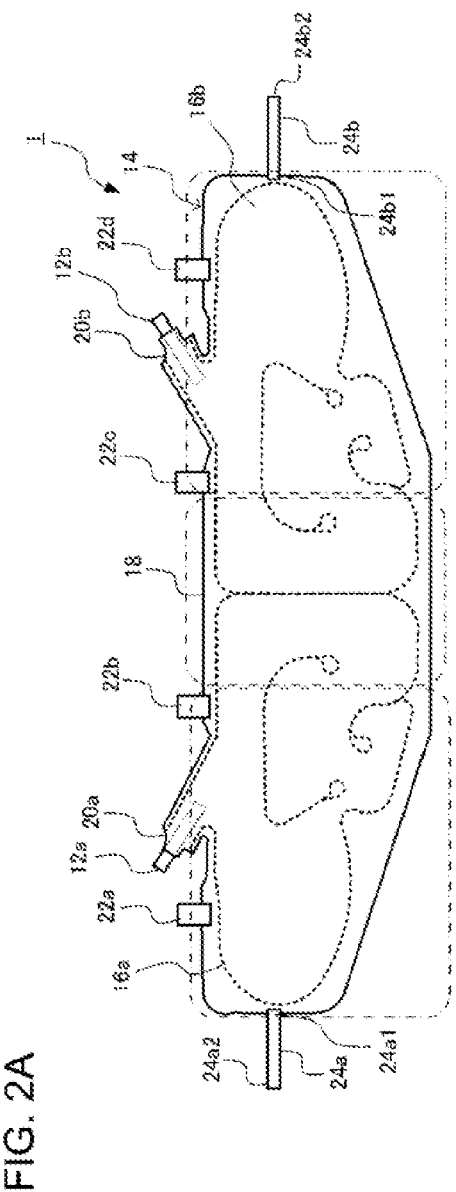
Figure 2B:
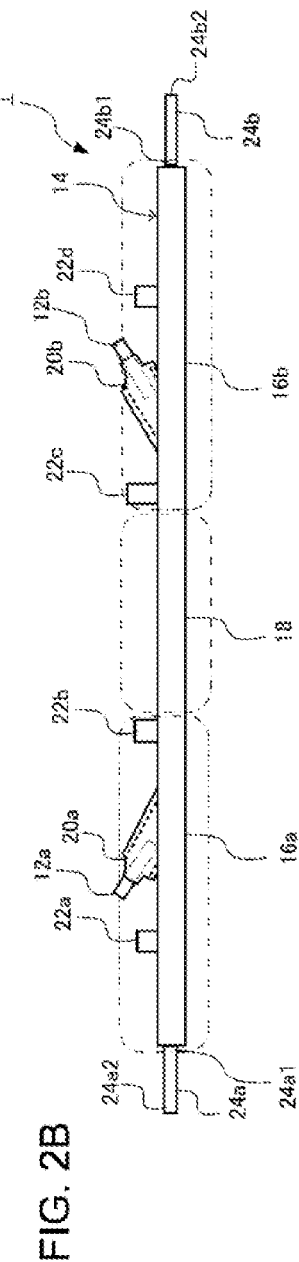

FIG. 1 is a side view (A) and a front view (B) illustrating the state in which the airbag apparatus 1 according to the first example of the present invention is mounted on a vehicle seat (2, 3), wherein the vehicle seat (2, 3) is illustrated as being transparent. FIG. 2 illustrates the structure of an airbag 14 employed in the airbag apparatus 1 according to the first example, wherein FIG. 2(A) is a plan view illustrating the state in which the airbag 14 is deployed (state prior to being housed), while FIG. 2(B) is a front view illustrating the state in which the airbag 14 is rolled (state when housed).

The airbag apparatus 1 according to the present example is equipped in a vehicle seat having a seat cushion 3 forming a seating surface and a seat back 2 forming a backrest. The airbag apparatus 1 includes a pair of inflators 12a, 12b housed in the left and right side portions of the seat back 2 and generating inflation gas, along with an airbag 14 that is housed in the seat back 2 in a rolled or folded state and deployed by inflation gas released from the inflators 12a, 12b. Note that, in the present example, the seat back 2 is integrated with the head rest, but may also be applied to a seat equipped with a head rest as a separate member.

The airbag 14 is configured to include a pair of left and right side chambers 16a, 16b that deploy toward the front from the side portion of the seat back 2 and restrain at least the movement of the shoulders from the waist of the passenger, along with an upper chamber 18 that couples the pair of side chambers 16a, 16b and is located above the head of the passenger when the airbag 14 is deployed. The side chambers 16a, 16b may be symmetrically shaped. The upper chamber 18 is also located in the longitudinal center of the airbag 14 in the unfolded state prior to being housed (FIG. 2) and is integrally shaped by the same fabric as the side chambers 16a, 16b.

The upper chamber 18 of the airbag 14 is in fluid communication with the side chambers 16a, 16b such that the inflation gas released from the inflators 12a, 12b flows into the upper chamber (18) from the side chambers 16a, 16b. Further, the upper chamber 18 deploys from near the upper edge of the seat back 2 to extend over the head rest and deploy so as to cover the upper portion of the head of the passenger (FIG. 3).

The airbag apparatus 1 according to the present example includes first connecting members (tab) 22a, 22b, 22c, 22d for fixing an airbag 14 compressed into a roll to the seat back 2. The first connecting members 22a, 22b, 22c, 22d are disposed one at a time on the upper portion and lower portion of the inflators 12a, 12b on the left and right side portions of the seat back 2. Note that the inflators 12a, 12b are configured to be introduced from inflator introduction portions 20a, 20b of the airbag 14.

By providing the first connection members 22a, 22b, 22c, 22d on the upper portion and lower portion of the inflators 12a, 12b, it becomes possible to fix the vicinity (around the inflators) where the largest pressure occurs in the early stages of deployment of the airbag 14, stabilizing the deployment behavior of the airbag 14.

Note that the first connecting members may be provided in the head region, the thoracic region to the abdominal region, and the waist region of the passenger on the left and right side portions of the seat back 2. In this case, it is possible to restrain and protect all of the areas of the passenger seated in the seat.

The airbag apparatus 1 according to the present example further includes, on both left and right sides of the seat, first end portions (24a1, 24b1) coupled near the lower end of the airbag 14 in housed and strip-shaped second connecting members 24a, 24b having second end portions (24a2, 24b2) coupled to the side portion of the seat cushion 3. The second connecting members 24a, 24b may be tethers formed of the same material (fabric) as the airbag 14. Here, the first end portions (24a1, 24b1) of the second connecting members 24a, 24b are coupled near the lower end portion of the side chambers 16a, 16b in their deployed state.

FIG. 3 illustrates the operating state (airbag 14 deployment state) of the airbag apparatus 1 according to the first example, wherein FIG. 3(A) illustrates the state when viewed from the side in the width direction of the vehicle, while FIG. 3(B) illustrates the state when viewed from the front.

When a side collision or the like of the vehicle occurs, the inflation gas is released from the inflators 12a, 12b and the airbag 14 expands and deploys. As the airbag 14 begins to expand, the gas first flows into the side chambers 16a, 16b before flowing into the upper chamber 18. As a result, the side chambers 16a, 16b deploy from the side portion of the seat back 2 toward the front, after which the upper chamber 18 located above the head of the passenger deploys towards the front over the head rest.

The airbag 14 according to the present example is configured so as to include the pair of left and right side chambers 16a, 16b that restrain the movement of the shoulders from the waist of the passenger, along with the upper chamber 18 located above the head of the passenger and coupling the pair of side chambers 16a, 16b to each other, so that the airbag 14 is deployed in a dome shape to cover the passenger seated in the seat 3 from the left and right portions and from the upper portion. As a result, it becomes possible to reliably restrain the movement of the passenger in at least the left and right direction, above, and diagonally above, making it possible to appropriately protect the passenger from the head to the waist of the passenger.

Moreover, the configuration by which the inflation gas flows from the side chambers 16a, 16b to the upper chamber 18 allows the side chambers 16a, 16b to initially deploy and quickly restrain the lateral movement of the passenger.

The upper chamber 18 is deployed from near the rear edge of the upper end of the seat back 2. Deploying the upper chamber 18 from near the rear edge of the upper end of the seat back 2 allows the upper chamber 18 to cover the rear of the head of the passenger toward the front. Thus, the upper chamber 18 may be prevented from striking the head of the passenger directly when the airbag 14 is deployed. Note that in the event the seat back and the head rest are configured as separate members, the coupling member 18 is deployed overriding (extending) from the upper end of the seat back to the front of the head rest.

Moreover, in order to fix the airbag 14 to the seat back 2 by the plurality of first connecting members 22a, 22b, 22c, 22d, the possibility of gaps occurring between the seat back 2 and the airbag 14 when the airbag 14 is deployed may be reduced. As a result, when the passenger contacts the airbag 14 during a collision of the vehicle, for example, the passenger may be reliably restrained without protruding from the gap between the airbag 14 and the seat back 2.

Further, strip-shaped second connecting members 24a, 24b are provided that couple the vicinity of the lower end of the airbag 14 and the side portion of the seat cushion 3, enabling the restraining performance near the waist of the passenger seated in the seat (2, 3) to be improved. That is, the second connecting members 24a, 24b may securely hold the airbag 14 when the waist, which is close to the position of the center of gravity of the passenger, moves in a direction that pushes the airbag 14 toward the outside, thereby avoiding a situation in which the passenger jumps out laterally.

Moreover, coupling the first end portions (24a1, 24b1) of the second connecting members 24a, 24b near the front end portions of the side chambers 16a, 16b allows the deployed positions of the side chambers 16a, 16b to be held in an appropriate state. If the first end portions (24a1, 24b1) of the second connecting members 24a, 24b are coupled near the rear end portions of the side chambers 16a, 16b, it is anticipated that the front portions of the side chambers 16a, 16b will be unaffected and the behavior will not be stable when the airbag 14 is deployed. In this regard, if the first end portions (24a1, 24b1) of the second connecting members 24a, 24b are coupled near the front end portions of the side chambers 16a, 16b, the positions of the front portions of the deployed side chambers 16a, 16b may be appropriately maintained (controlled), thereby improving the restraining performance of the passenger.

In the present invention, the folded portion 100 is formed by folding a location corresponding to the upper chamber 18 of the long bar shaped airbag 14 and the folded portion 100 is housed above the seat back 2. A portion of the long bar shaped airbag 14 below the folded portion 100 is housed along the longitudinal direction of the side surface of the seat back 2. Note that the folded portion 100 may include a portion above the side chambers 16a, 16b.

By folding and accommodating the upper portion of the long bar shaped airbag 14, deployment of the folded portion 100 is slightly delayed. That is, the predominately lower side of the unfolded side chambers 16a, 16b initially deploys and quickly restrains the lateral movement of the passenger. Folding the upper portion of the airbag 14 may also ensure that a sufficient capacity of the airbag covers the head of the passenger above the seat back 2.

Further, the folded portion 100 (upper chamber 18) may extend over the head rest and deploy so as to cover the upper portion of the head of the passenger to significantly reduce the possibility of damage to the head of the passenger. If the folded portion 100 is deployed from the front of the head rest, the airbag 14 may directly hit the head of the passenger and pose a risk of head injury and/or neck failure.

FIGS. 4(A) to 4(E) are explanatory diagrams illustrating variations of the folded portion 100 of the airbag apparatus according to the present invention and illustrate the state in which the folded portion 100 is viewed from the back side of the seat back 2.

FIGS. 4(A) and 4(B) illustrate an example in which the folded portion 100 is shaped into an omega (Ω) shape and an inverted omega shape. In this example, the bar shaped compressed airbag 14 is disposed substantially along the edges (left edge, top edge, right edge) of the seat back 2 so as to pass from one side surface of the seat back 2 through the upper portion to reach the other side surface. At this time, when the bar shaped airbag 14 extending from the left and right direction end portion of the upper portion of the seat back 2 toward the center in the left and right direction is folded back and again extending in the end portion direction (outer side), first folded back portions 101L, 101R are formed near the center. Moreover, second folded back portions 102L, 102R are formed extending in the left and right direction from the first folded back portions 101L, 101R and are folded back toward the center near the end portion of the upper portion of the seat back 2.

Further, the form in which the first folded back portions 101L, 101R are located below the second folded back portions 102L, 102R is an omega (A) shape, and conversely, the form in which the first folded back portions 101L, 101R are located above the second folded back portions 102L, 102R is an inverted omega (B) shape.

As illustrated in FIG. 4(A), shaping the folded portion 100 into an omega shape increases the momentum of the folded portion 100 (18) deploying upward when the airbag is deployed 14, and even when the head rest is relatively large, the airbag 14 (upper chamber 18) is more likely to protrude towards the front extending over the head rest.

On the other hand, as illustrated in FIG. 4(B), by shaping the folded portion into an inverted omega shape, when the airbag 14 is deployed, the folded portion 100 (18) is more likely to deploy toward the left and right width direction, allowing the movement of the head of the passenger in the left and right direction to be quickly restrained.

FIG. 4(C) illustrates an example in which the folded portion 100 is shaped into an M shape. In this example, the bar shaped compressed airbag 14 is disposed substantially along the edges (left edge, top edge, right edge) of the seat back 2 so as to pass from one side surface of the seat back 2 through the upper portion to reach the other side surface. Further, third folded back portions 103L, 103R are formed in which the bar shaped airbag 14 extending in the upper portion direction from the left and right end portions of the upper portion of the seat back 2 and are folded back toward the center direction and the lower side, and further, a fourth folded back portion 104 is formed extending downward from the third folded back portions 103L, 103R and folded back near the center.

As illustrated in FIG. 4(C), by shaping the folded portion 100 into an M shape, when the airbag 14 is deployed, the folded portion 100 (upper chamber 18) is more likely to deploy toward the left and right width direction, allowing the movement of the head of the passenger in the left and right direction to be quickly restrained.

As illustrated in FIGS. 4(A) to 4(C), by folding the portion of the airbag 14 corresponding to the upper chamber 18 with left-right symmetry, the airbag apparatus according to the present invention may be widely applied to various seats without concern of the far side and the near side of the vehicle seat.

FIGS. 4(D) and 4(E) illustrate an example in which the folded portion 100 is shaped into an S shape or a Z shape. In this example, the bar shaped compressed airbag 14 is disposed substantially along the edges (left edge, top edge, right edge) of the seat back 2 so as to pass from one side surface of the seat back 2 through the upper portion to reach the other side surface. Further, in the case of the S-fold illustrated in FIG. 4(D), a fifth folded back portion 105 is formed in which a rod shape airbag 14 extending from one end portion (first end portion 121) to the other end portion (second end portion 122) of the upper portion of the seat back 2 is folded back toward the first end portion 121 in the vicinity of the second end portion 122, while a sixth folded back portion 106 is formed extending from the fifth folded back portion 105 and folded back so as to extend back toward the second end portion 122 at the first end portion 121. Note that in the S shape and the Z shape, the first end portion 121 and the second end portion 122 are reversed.

By shaping the folded portion 100 so as to be left-right asymmetric, such as an S shape or a Z shape, deployment on the left and right side of the seat back 2 quickens, while deployment on the other side is delayed; therefore, for example, by disposing the one that deploys earlier on the near side (door side), the passenger may be appropriately protected during a side collision. That is, by using a different airbag in the folding direction (S shape or Z shape) on the near side and the far side, it becomes possible to appropriately protect the passenger during a side collision.

The present invention has been described with reference to examples; however, the present invention is not limited to the examples described above. In other words, the present invention may be changed as appropriate without departing from the scope of the technical concept of the present invention.

The invention claimed is:

1. An airbag apparatus in combination with a vehicle seat having a seat cushion that forms a seating surface and a seat back that forms a backrest, the airbag apparatus comprising:
    an inflator for generating inflation gas; and
    an airbag carried by the seat back and deployable by inflation gas released from the inflator;
    wherein:
    the airbag includes first and second inflatable portions deployable forwardly from first and second lateral side portions of the seat back, respectively, and an upper inflatable portion disposed laterally between the first and second inflatable portions and deployable upwardly from the seat back;
    the airbag is rolled in a direction that intersects a longitudinal direction from a flat unfolded state prior to being housed or folded to be compressed into a long bar shaped airbag; and
    a folded portion is formed by folding at least a location corresponding to the upper inflatable portion of the long bar shaped airbag to house the folded portion above the seat back.

2. The airbag apparatus according to claim 1, wherein the folded portion is shaped substantially symmetrically when viewed from the back surface of the seat back.

3. The airbag apparatus according to claim 2, wherein the folded portion is shaped into an omega (Ω) shape when viewed from the back surface of the seat back.

4. The airbag apparatus according to claim 2, wherein the folded portion is shaped into an inverted omega shape when viewed from the back surface of the seat back.

5. The airbag apparatus according to claim 2, wherein the folded portion is shaped into an M shape when viewed from the back surface of the seat back.

6. The airbag apparatus according to claim 1, wherein the folded portion is asymmetrically shaped when viewed from the back surface of the seat back.

7. The airbag apparatus according to claim 6, wherein the folded portion is shaped into an S shape when viewed from the back surface of the seat back.

8. The airbag apparatus according to claim 6, wherein the folded portion is shaped into a Z shape when viewed from the back surface of the seat back.

9. The airbag apparatus according to claim 1, wherein the upper inflatable portion is configured so as to be deployable from near an upper end of a back surface of the seat back.

10. The airbag apparatus according to claim 1, wherein a portion of the long bar shaped airbag below the folded portion is housed along the longitudinal direction of a side surface of the seat back.

11. The airbag apparatus of claim 10, wherein inflation gas released from the inflator is configured so as to flow from the first and second inflatable portions to the upper inflatable portion.

12. The airbag apparatus according to claim 11, wherein the inflator is coupled to each of the first and second inflatable portions.

13. The airbag apparatus according to claim 10, comprising a second connecting member connected to the vicinity of an end portion of the long bar shaped airbag and a side portion of the seat cushion.

14. A vehicle seat comprising the airbag apparatus described in claim 1.

* * * * *